United States Patent [19]

Kozyrski et al.

[11] Patent Number: 4,916,820
[45] Date of Patent: Apr. 17, 1990

[54] CIRCLE AND STRIP CUTTING SYSTEM

[75] Inventors: Vincent T. Kozyrski; Claude R. Millett, both of Plainville, Conn.

[73] Assignee: The Fletcher-Terry Company, Farmington, Conn.

[21] Appl. No.: 231,728

[22] Filed: Aug. 12, 1988

[51] Int. Cl.[4] .......................... B26D 3/08; C03B 33/10
[52] U.S. Cl. ...................... 33/42; 33/27.03; 30/164.75; 225/96; 83/886
[58] Field of Search ................. 83/879, 468, 455, 456, 83/464, 745, 490, 552, 614, 483, 582, 481, 829, 522, 882, 884, 886; 225/96; 33/27.03, 42, 41.1, 41.5, 32.2; 30/164.9, 164.95, 300, 310

[56] References Cited

U.S. PATENT DOCUMENTS

| | | | |
|---|---|---|---|
| 1,421,921 | 7/1922 | Doerr | 33/27.03 |
| 1,598,993 | 9/1926 | Vlazny | 33/27.03 X |
| 1,773,048 | 8/1930 | Linke | 30/300 |
| 2,134,332 | 10/1938 | Hubbard | 83/468 X |
| 3,111,761 | 11/1963 | McAlister | 33/27.03 |
| 3,491,448 | 1/1970 | Quinton et al. | 33/27.03 |
| 4,083,274 | 4/1978 | Insolio et al. | 83/481 X |
| 4,110,907 | 9/1978 | Einhorn et al. | 225/96 X |
| 4,590,834 | 5/1986 | Sobel | 83/614 X |

Primary Examiner—Frank T. Yost
Assistant Examiner—Rinaldi Rada
Attorney, Agent, or Firm—Ira S. Dorman

[57] ABSTRACT

Apparatus for manually cutting both circles and strips from glass utilizes either a center support structure or an edger, in combination with a rule having different scales on opposite surfaces, and with a cutting head adjustably mounted on the rule. Reversal of the position of the cutting head on the supporting rule adapts it for use with either of two different forms of cutting components, and the edger is constructed not only to compensate for offset between the registration and cutting elements of the head, but also to enable use of the edge of either the glass workpiece or a furring strip as the reference surface along which the edger is run to cut strips.

4 Claims, 5 Drawing Sheets

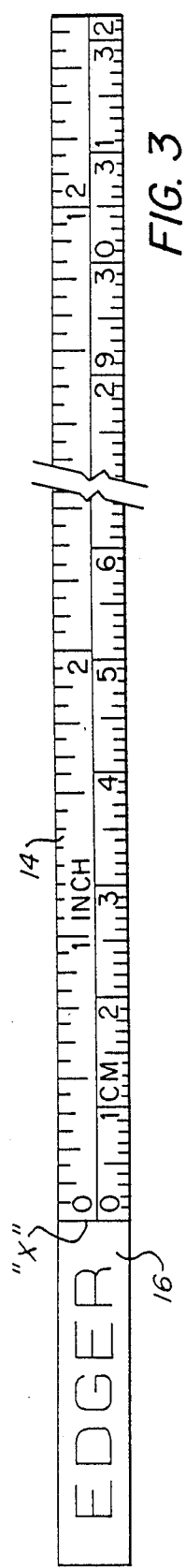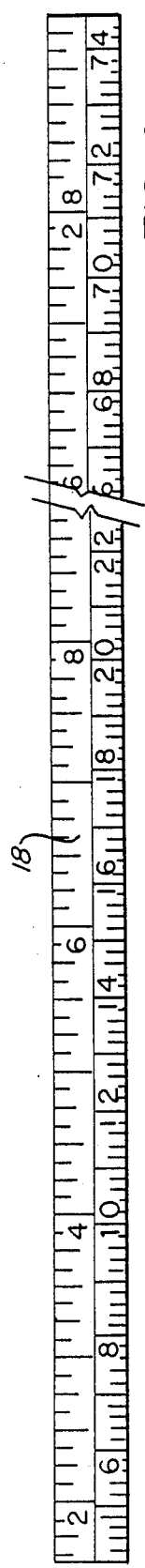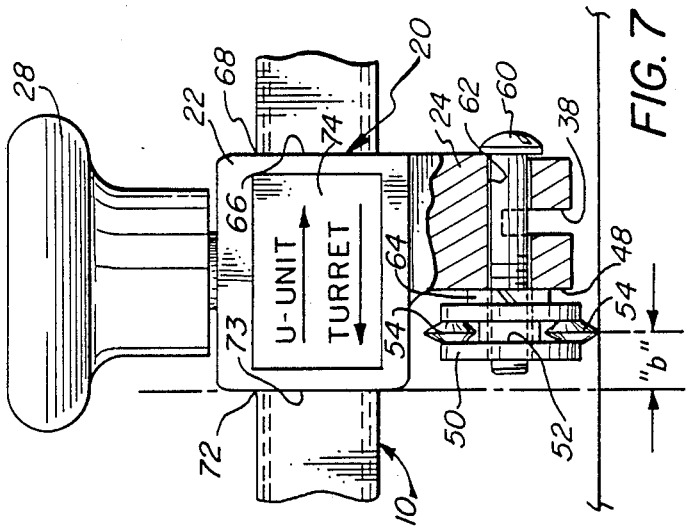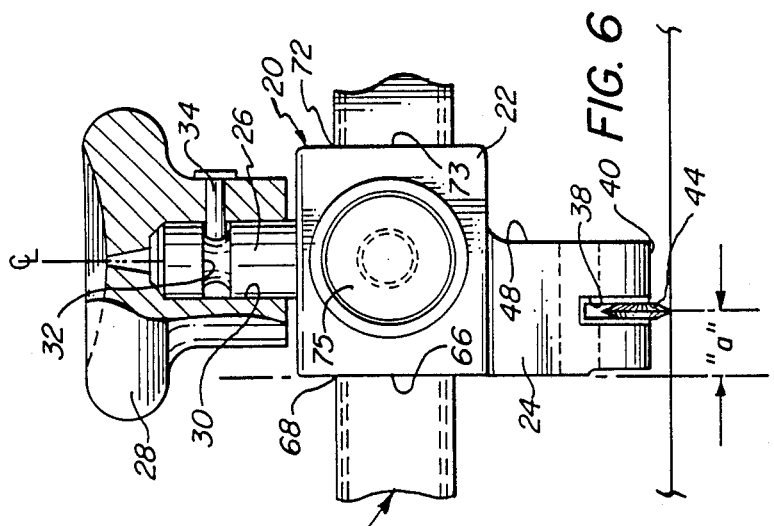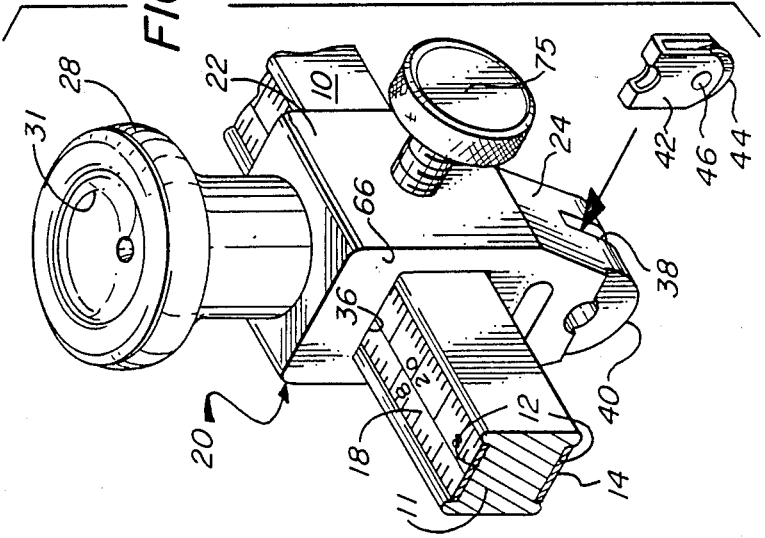

4,916,820

CIRCLE AND STRIP CUTTING SYSTEM

BACKGROUND OF THE INVENTION

Devices for manually cutting circles from pieces of glass have long been known and are commercially available. They typically consist of a central supporting structure, to which is pivotably attached a radially extending arm, which in turn serves to mount a cutting head for movement in a circular path about the supporting structure. The mounting arm will normally be provided With a distance scale to facilitate setting of the head for cutting a circle of the desired diameter.

It is conventional to provide an edge guide for use with the mounting arm and cutting head of such a device, in place of the central supporting structure, to cut strips. The guide may be adapted to engage either the edge of the piece of glass, or the edge of a furring strip against which the glass is abutted.

Nevertheless, a demand exists for aPParatus which is adapted to enable cutting of glass circles and strips to precise specifications and in several modes of operation, and which is facile and convenient to use and relatively inexpensive to produce. And accordingly, it is the object of the present invention to provide a novel system which has those features and affords those capabilities.

SUMMARY OF THE INVENTION

It has now been found that the foregoing and related objects of the present invention are attained by the provision of a mechanical system that includes a rigid rule, a cutting head, first and second cutting components, a pivot base assembly, and a strip guide. The rule is elongated and rectilinear, and has a scale with distance-indicating indicia thereon and with a zero reference point adjacent to, but spaced from, one end thereof. The cutting head includes a body with a laterally extending passage Way, configured to receive the rule inserted longitudinally thereinto to slidably mount the head, and means is provided for disengageably securing the head at any selected position therealong. Registry elements, provided on the body at the opposite ends of its passageway, are adapted for readable registry with the indicia of the rule scale, and the body has first and second means for disengageably mounting the first and second cutting components, respectively. The two cutting components are configured differently from one another, but each has at least one cutting element thereon and is adapted for mounting on the body of the cutting head. The element of each cutting component is laterally spaced, by a certain distance, from one or the other of the registry elements of the body When the component is mounted thereon. The base of the pivot assemblY is adapted to provide stationary support for the system, and the rotatably mounted coupling fixture has means for disengageablY securing an end portion of the rule, to extend radiallY from the base.

The strip guide has an elongated body, through which extends a lateral passagewaY which is configured to receive and secure the end portion of the rule, With the body disposed to either side of the zero reference point thereon. A bottom portion of the guide bodY has at least two lateral bearing surfaces, which extend along axes that are Parallel to, but spaced to the opposite sides of, a longitudinal centerline of the body, and which are adapted for slidable engagement on a cooperating surface; the bearing surface on one side of the guide body is spaced further from the centerline than is the bearing surface on the other side thereof. A top portion of the guide body provides lateral reference elements at the opposite ends of its passageway, which are adapted for readable registry With the indicia of the rule scale, the reference element on the "one" side of the guide body being nearer to its centerline than is the reference element on the "other" side thereof. The distance differential of the axes of the bearing surfaces on the bottom portion of the body, relative to the centerline, is the same as the distance differential of the reference elements on the top portion thereof, relative to the centerline, and both are equal to the "certain" distance that exists between the cutting elements and the registry elements of the cutting head body. As a result, the cutting element of either the first cutting component or the second cutting component, when mounted as described, can be disposed in any selected plane lying transverse to the longitudinal axis of the rule, by registry of the "one " or the "other" registry element, respectively, of the cutting head body with a selected indicium of the scale. Setting of the distance between the selected plane and a chosen one of either of the bearing surfaces on the strip guide body is achieved by brining the reference element, disposed on the same side of guide bodY a the chosen bearing surfaces, into registry with the zero reference point of the rule scale.

In the preferred embodiments, the rule will have two different scales with numeric indicia of ascending values thereon, one of the scales including the zero reference point and the other commencing with an indicium having a value greater than zero, the commencing indicium being indicative of the distance from the axis of pivoting of the coupling fixture, when the rule is secured in a predetermined reference position. Generally, the rule will have a plurality of surfaces thereon extending along its length, with each scale being on a different surface, the rule being orientable in the securing means of the coupling fixture so as to selectively dispose each surface upwardly. One of the scales may be graduated to designate actual distances, for use With the strip guide, With the other being graduated to designate double the actual distances, for use With the pivot base to designate the diameters of circles circumscribed. Legend means Will advantageously be provided on the cutting head to correlate each of the registry elements to either the "first" or the "second" cutting component, so as to facilitate proper positioning of the head.

The base of the pivot assembly will usually have an upstanding cylindrical portion, and the coupling fixture used therewith will include a collar portion engaged upon the cylindrical portion and rotatable about the base. The securing means of the coupling fixture may comprise an arm portion, having an inwardlY extending recess that is adapted to receive the end portion of the rule.

BRIEF DESCRIPTION OF THE DRAWINGS

FIG. 3 is a fragmentary plan view of a scale element for the rule utilized in the system of the invention, drawn to a scale that of FIGS. 1 and 2;

FIG. 4 is a view similar to that of FIG 3, showing a second scale for the rule;

FIG. 5 is a fragmentary perspective view, drawn substantially to the scale of FIGS. 3 and 4, showing the cutting head of the system mounted upon the rule, with the cutting component displaced therefrom;

FIG. 6 is a fragmentary, side elevational view of the cutting head mounted upon the rule, with the single-wheel cutting component in place and with the handle shown in partial section;

FIG. 7 is a view similar to that of FIG. 6, with the cutting head inverted on the rule and mounting a turret-like, multi-wheel cutting component, and with the lower portion of the body shown in section;

DETAILED DESCRIPTION OF THE ILLUSTRATED EMBODIMENTS

Figure 1:
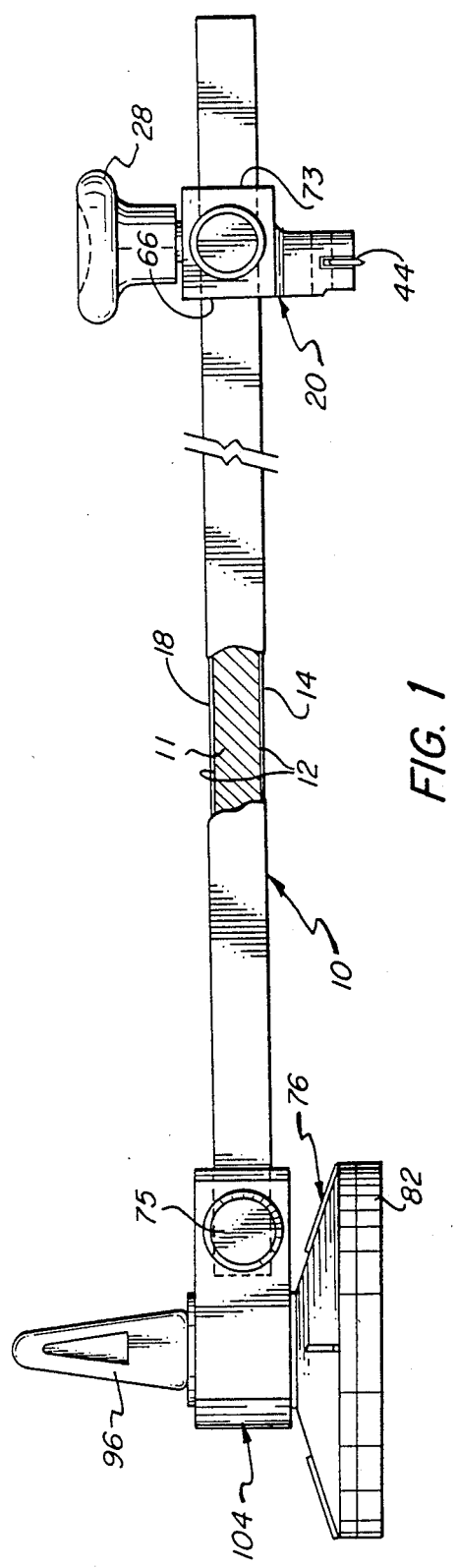
FIG. 1 is a fragmentary side elevational view of a device provided in the novel sYstem of the invention, with a portion broken away to show detail.
Figure 2:
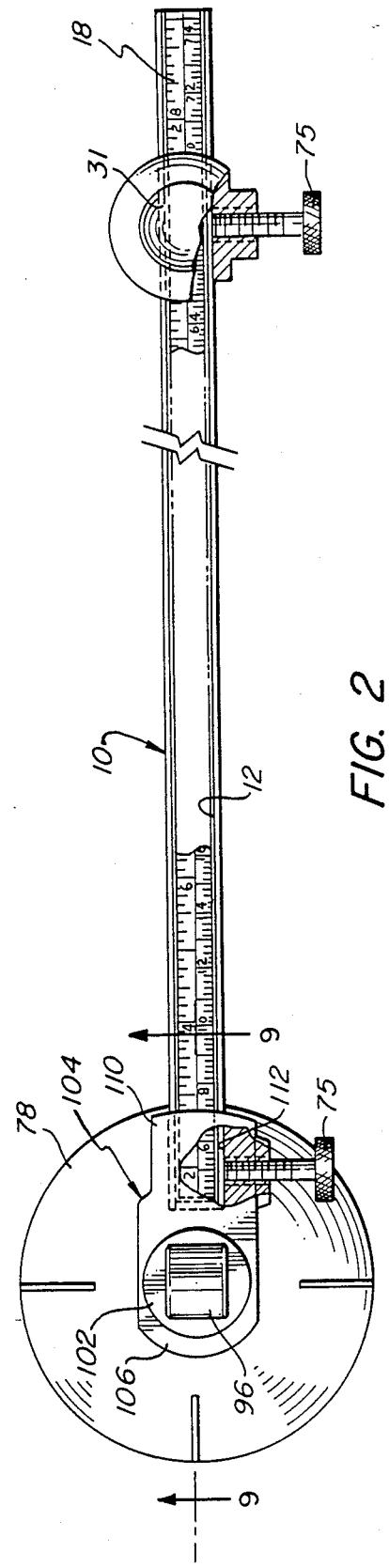
FIG. 2 is a fragmentarY plan view of the device of FIG. 1, also having portions broken away.

Turning now in detail to the appended drawings, the circle and strip system of the invention utilizes a rigid, elongate, rectilinear rule, generally designated by the numeral 10, consisting of a body 11 of square cross section having shallow channels 12 running along its length and on opposite sides thereof. Each of the channels 12 seats one of the scale elements 14, 18, which are illustrated in greatest detail in FIGS. 3 and 4 and consist of plastic strips secured within the channels, upon which linear distance indicia are printed. The scale element shown in FIG. 3 has an end portion 16 bearing the word "EDGER", bordered by a zero reference point (the line designated "x" in the FIG.); the scale extending therefrom is in actual inches or centimeters, as indicated. The scale on the element 18 is denoted however in double-length (i.e., twice actual) distances, thereby enabling it to be used to read diameter measurements directly; it will also be noted from FIG. 4 that the scale begins at approximately the 1⅜ inch mark, the reason for which will be discussed hereinafter.

With particular reference now to FIGS. 5-7, the cutting head utilized in the system of the invention is illustrated in detail, and is seen to include a body, generally designated by the numeral 20, having a generally cubic upper portion 22 and a reduced-dimension lower portion 24. Projecting upwardly on the centerline of body 20 is a cylindrical post 26, upon which is seated a handle 28 having an upwardly extending bore 30, in which the post 26 is engaged, and a shallow depression 31 in its top surface. A circumferential groove 32 is formed into the post 26, and receives the tip of a small pin 34 which extends radially through a hole in the lower portion of the handle 28 to retain it in rotatable assembly.

A slot 38 extends transversely across the lower portion 24 of the body 20, and inwardly from the end surface 40. It serves to seat a cutting component, which consists of a U-shaped insert piece 42 carrying a cutting wheel 44 on a transverse axle 46 between its wall elements. The component is assembled with the body 20 simply by inserting it inwardly from the end surface 40 into the slot 38, and is held in place by frictional engagement of the wall elements upon the opposing surfaces defining the slot.

Figure 8:
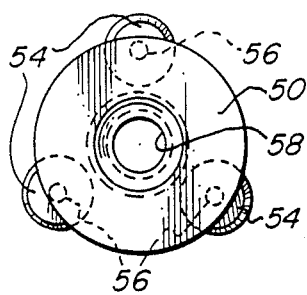
FIG. 8 is a plan view of the cutting component utilized in the assembly of FIG. 7.

The bottom portion 24 of the body has a lateral surface 48 parallel to, but offset slightly from, the centerline of the body. A second form of cutting component, best seen in FIGS. 7 and 8, employs a turret disc 50 having a dee circumferential groove 52 thereabout in which are rotatably mounted three cutting wheels 54. The wheels 54 are mounted upon transverse axles 56, which are equidistantly spaced from one another and from the central axis of the disc 50. The turret disc is mounted upon the body 20 by use of a screw 60, which extends through the laterally extending bore 62 of the body portion 24 and is threadably engaged within the aperture 58. A lock washer 64 is interposed between the lateral surface 48 of the body 20 and the confronting surface of the turret disc 50.

The edge 68, formed at the intersection of the passageway 36 with the lateral body surface 66, provides a registry element. The distance "a", between the plane in which it lies and that on which the edge of the cutting wheel 44 is disposed, is of significance, as will be explained hereinafter. A comparable lateral surface 72 is provided on the upper body portion 22 at the opposite end of the passageway 36, and defines a like registry element 72 at the intersection of the lateral surface 73 therewith. As indicated in FIG. 7, the planes in which the element 72 and the cutting edges of the wheels 54 of the turret assembly lie are spaced from one another by a distance "b", equal to distance "a".

Label 74, applied to one surface of the body, bears the notations "U-UNIT" and "TURRET", with arrows pointing to the opposite lateral surfaces 66, 73. These legends serve to indicate which of the two registry elements 68, 72 is to be employed as a reference for reading of the scale, depending upon which of the cutting components is in use. Thus, reversal of the position of the cutting head on the supporting rule adapts it for use with either of the two different forms of cutting components, as shown. A thumb screw 75 extends into the body 20 from the opposite side, and serves of course to clamp the cutting head in desired position on the rule 10.

Figure 9:
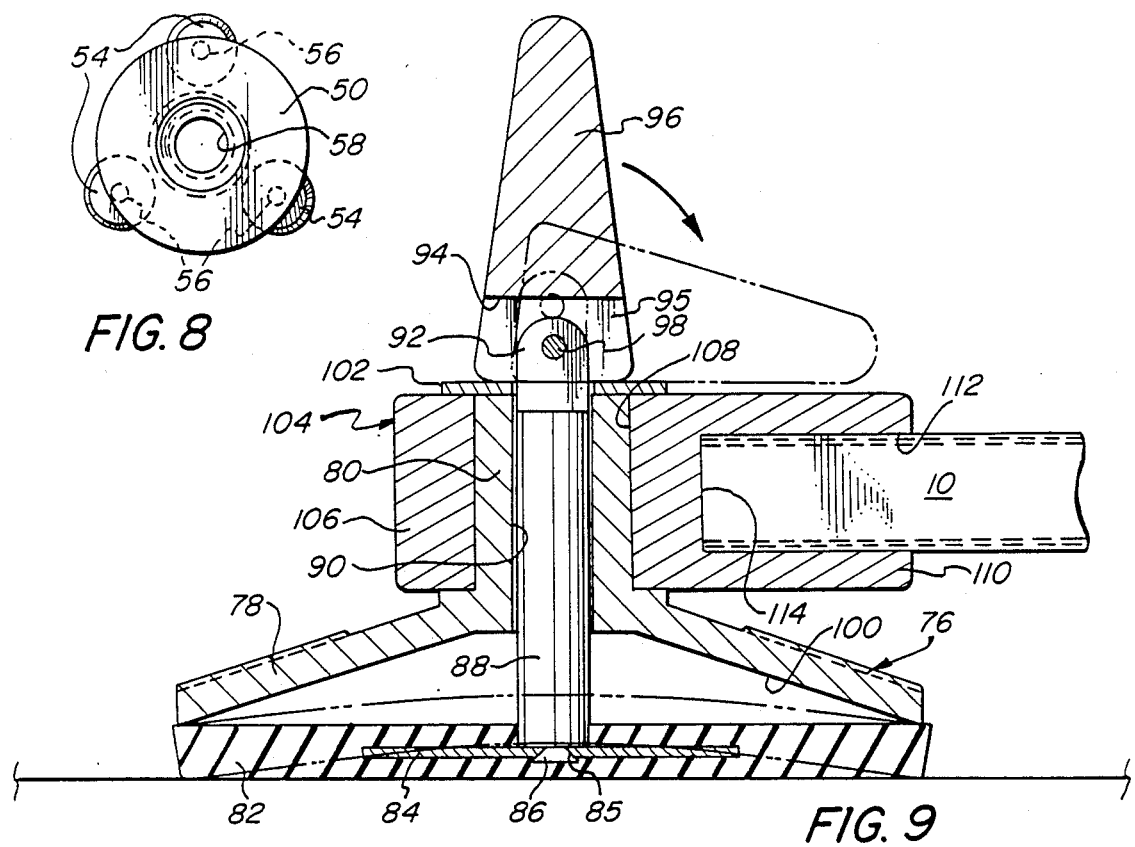
FIG. 9 is a fragmentary, vertical sectional view of the device of FIG. 2, taken along line 9-9 thereof and drawn to an enlarged scale, alternative positions of the evacuating mechanism thereof being shown in full and phantom line.

With particular reference now to FIG. 9, one form of center support is illustrated, and employs a pivot base, generally designated by the numeral 76, consisting of a conical lower portion 78 and a cylindrical portion 80 extending upwardly therefrom. An associated evacuating mechanism includes a flexible rubber disc 82, spanning the opening of the conical portion 78, within which is embedded a circular metal plate 84. The latter has a central aperture 85 within which a small lug 86 on the end of the cylindrical operating shaft 88 is formed; the shaft 88 extends through the bore 90 of the cylindrical portion 80 and has, on its upper end, an ear element 92 disposed within the slot 94 of an operating lever 96.

A pin 98 extends through the ear element 92 and is engaged in the opposite wall elements 95 (only one of which is visible in the FIG.) defining the slot 94, to maintain the parts in assembly while permitting pivotable movement of the lever 96, as indicated by the arrow. The lever 96 acts against a washer 102, seated upon the upper edge of the cylindrical portion 80 of the base 76, and serves to elevate the shaft 88 when turned to the phantom line position shown. This of course causes the rubber disc 82 to be withdrawn into the space 100 under the conical portion 78, thereby creating a vacuum force to hold the center support in position on the surface of a workpiece.

The coupling fixture, generally designated by the numeral 104, used with the base 76 has a collar portion 106, through which extends a passagewaY 108 of circular cross section; the cylindrical portion 80 of the base 76 is inserted into the passageway 108 to rotatably mount the coupling fixture. Arm portion 110 extends radially from the collar portion 106, and has an inwardly extending recess 112 of square cross section, dimensioned to snugly receive the end portion of the rule 10, the latter bottoming against the end wall 114 when fully inserted and being secured in position by tightening of the thumb screw 75 on the arm portion 110.

Figure 10:
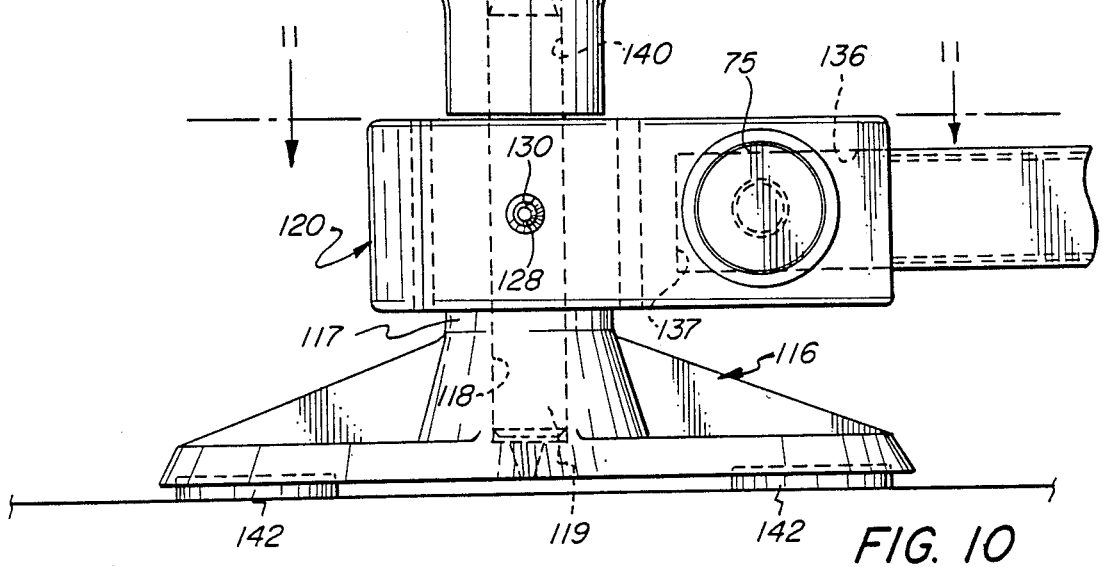
FIG. 10 is a fragmentary, side elevational view of a device provided by the instant system, utilizing a tripod form of pivot base assembly.
Figure 11:
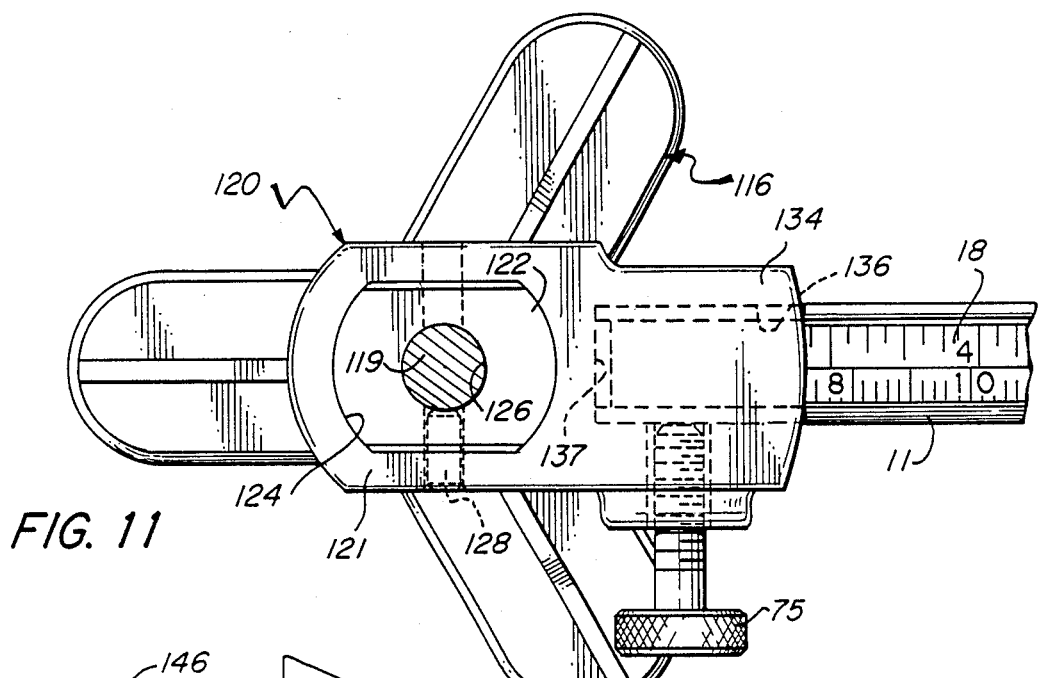
FIG. 11 is a substantially plan view of the device of FIG. 10, taken along line 11-11 thereof.
Figure 12:
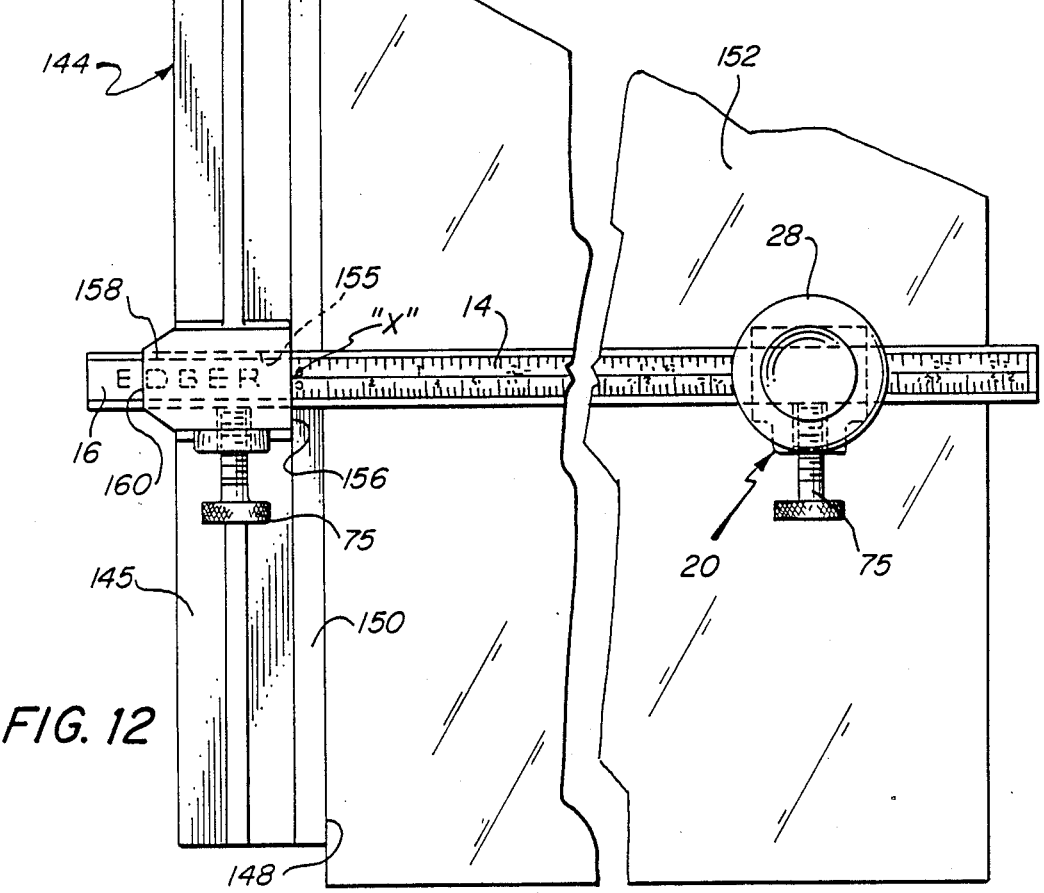
FIG. 12 is a fragmentary plan view showing a strip-cutting device provided by the system of the invention, positioned upon a piece of glass to be cut thereby.

A different form of center support is shown in FIGS. 10 and 11, which is manually held in place during use. It includes a tripod base, generally designated by the numeral 116, having a downwardly extending central bore 118 in which is engaged the lower end of a metal shaft 119. A coupling fixture, generallY designated bY the numeral 120, has a collar portion 121 at one end defining a flat-sided oval opening 124, in which is seated a correspondingly configured plug 122. The plug, in turn, has a passageway 126 of circular cross section extending through it and conforming in diameter to the shaft 119, thereby serving to rotatably mount the coupling fixture upon the base 116, the upstanding portion 117 of which provides underlying support. The collar portion 121 and the plug 122 have aligned, radially-extending apertures 130, in which a small pin 128 is engaged to lock the parts together. An arm portion 134 extends radially from the collar portion 121 of the fixture, and has an inwardly extending recess 136 of square cross section corresponding to that of the rule body 11. The end portion of the rule 10 is inserted into the recess 136 and is bottomed a against the end wall 137 thereof; it is retained in place by tightening of the thumb screw 75 on the arm portion 134.

The center support assembly also includes a knob 138, having an upwardly extending axial bore 140 by which it is mounted upon the upper end of the shaft 119. The shallow recess 141 formed into the top surface of the knob 138 facilitates the application of sufficient pressure to maintain the support in position, and rubber traction pads 142 are secured to the undersides of the three legs of the base for cushioning purposes and to prevent slippage so as to maintain the center support in position.

It will be appreciated that the rule 10 is inserted into the coupling fixtures 104, 120 (of both forms of center support) with the scale element 18 oriented upwardly for easy reading. It will also be appreciated that commencing the scale with a value above zero is necessary to take into account spacing from the axis of pivoting (represented by the centerline of either the shaft 88 or the shaft 119), so as to provide an accurate diametrical indication when the arm is fully inserted to afford a reference position.

Figure 13:
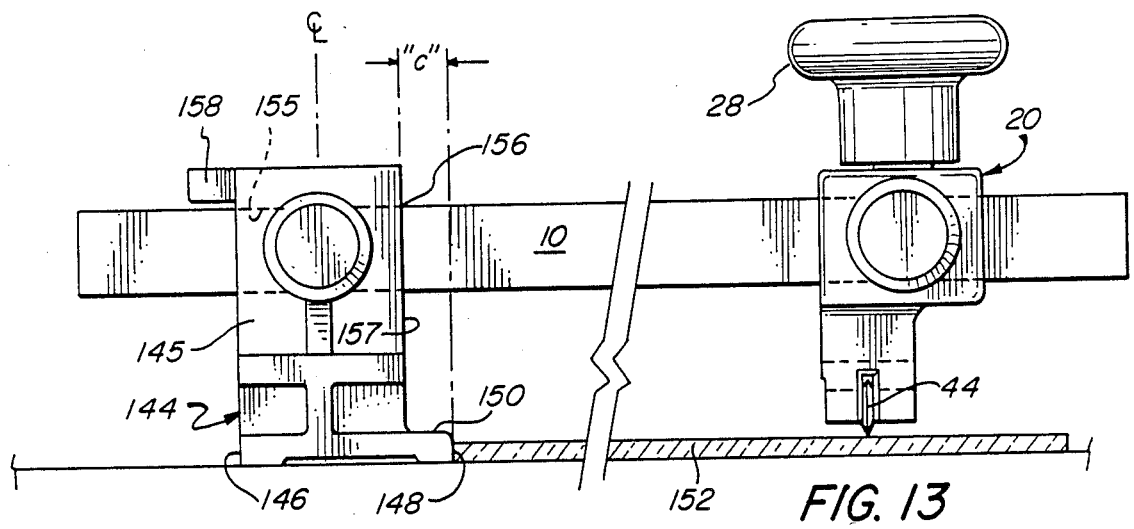
FIG. 13 is a fragmentary end view of the device and workpiece shown in FIG. 12, drawn to an enlarged scale.
Figure 14:
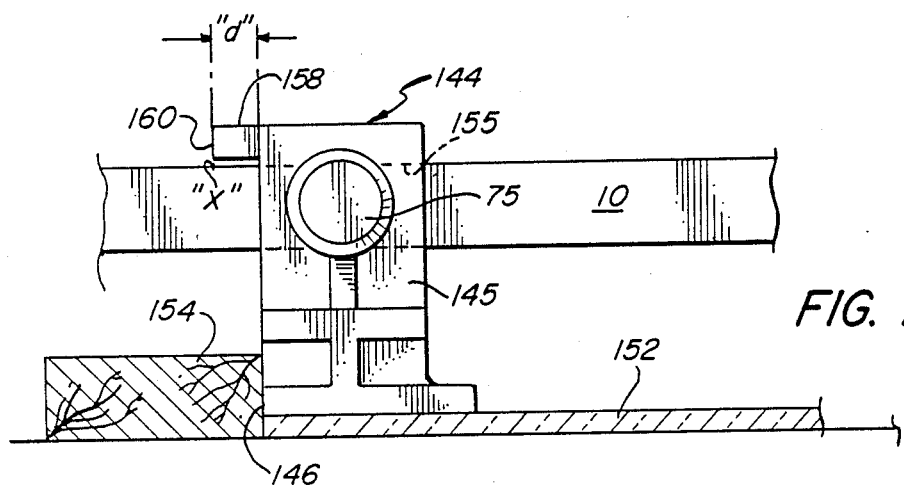
FIG. 14 is a view similar to that of FIG. 13, showing the device and workpiece used in association with a furring piece.
Figure 15:
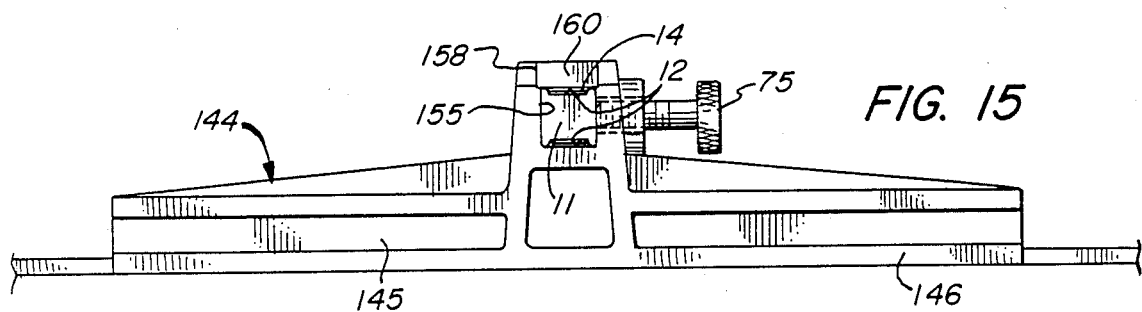
FIG. 15 is a side view of the device and glass piece shown in FIG. 13.

Turning now finally now to FIGS. 12-15, therein illustrated is a strip-cutting device provided by the system of the invention, wherein a strip guide, or edger, generally designated by the numeral 144 is employed in place of a center support. The edger consists of an elongated bodY 145 having a first rectilinear bearing surface 146 extending along one side of its bottom portion, and having a second such surface 148 extending along the opposite bottom side portion and provided by the outer edge of a narrow foot element 150. As seen in FIG. 13, the bearing surface 148 is used to engage the reference edge of the glass workpiece 152; and as seen in FIG. 14, the bearing surface 146 is used to contact the edge of a furring strip 154, which is secured by appropriate means to a work surface and against which the glass piece 152 is abutted for cutting.

A square passageway 155 (corresponding in cross section to that of the rule body 11) extends transversely through the upper portion of the edger body 145, and defines a first reference element 156 at the intersection thereof with the lateral surface 157 on one side of the body. A small tab element 158 projects laterally from the opposite side of the upper portion of the body and has a rectilinear outer edge 160 providing a second reference element. The elements 156, 160 serve to position the edger 144 at the zero reference point "x", and are employed alternatively, depending upon which of the bearing surfaces 146, 148 is to be utilized.

More particularly, with the rule 10 inserted into the passageway 155 (with the scale element 14, bearing the word "EDGER" upwardly oriented), the appropriate reference element is aligned with the zero reference point. Thus, if the edger were to be abutted against a furring strip, the reference element 160 would be aligned at point "x"; if instead the edger were to be used by running it along the edge of the glass 152, the reference element 156 would be used.

The distances between the planes in which the corresponding reference elements and bearing surfaces are disposed are indicated by the letters "c" and "d", in FIGS. 13 and 14, respectively. These distances are the same as those represented by the letters "a" and "b" in FIGS. 6 and 7, so as to enable accurate placement of the cutting elements 44, 54, relative to the bearing surfaces 146, 148, by use of the scale 14. That is, the offset of the bearing surfaces 146, 148 from their corresponding reference elements 160, 156, compensates for the offset of the cutting elements 44, 54 from their registry elements 168, 172.

Thus, it can be seen that the present invention provides a novel mechanical system which is adapted to enable cutting of glass circles and strips to precise specifications, and in several modes of operation, which is facile and convenient to use, and is of relatively uncomplicated and inexpensive construction.

Having thus described the invention, what is claimed is:

1. A mechanical system for cutting strips from glass and the like, comprising:
   a rigid, elongated, rectilinear rule having a scale with distance-indicating indicia thereon and with a zero reference point adjacent to, but spaced from, one end thereof;
   a reversible cutting head, including a body with a laterally extending passageway having opposite ends and configured to receive said rule, inserted longitudinally thereinto, for slidably mounting said head thereon, and means for disengageably securing said head on said rule at selected positions therealong, said body having registry elements thereon lying in lateral planes at said opposite ends of said passageway and adapted for readable registry with said indicia of said rule scale, said body also having first and second cutting component-mounting means, each adapted for disengageably mounting a cutting component thereon, said first mounting means being adapted to mount a cutting component to act in a first plane of said body, said first plane lying nonsymmetrically between said lateral planes and being laterally spaced by a certain distance from one of said registry elements, said second mounting means being adapted to mount a cutting component to act in a second plane of said body, said second plane lying nonsymmetrically between said lateral planes and being laterally spaced by said certain distance from the other of said registry elements; and a strip guide, including an elongated body with a laterally extending passageway having opposite ends and configured to receive a portion of said rule at said one end of said rule, with said guide body disposed to either side of said zero reference point, and means for securing said guide body on said rule, said guide body having a bottom portion with at least two lateral bearing surfaces extending, respectively, along axes that are perpendicular to the axis of said guide body passageway, and that are parallel to, but spaced to the opposite sides of, a longitudinal centerline of said guide body and adapted for slidable engagement on a cooperating surface, said bearing surface on one side of said guide body being spaced further from said centerline that is said bearing surface on the other side thereof, said guide body also having a top portion with lateral reference elements, at said opposite ends of said guide body passageway, adapted for readable registry with said indicia of said rule scale, said reference element on said one side of said guide body being nearer to said centerline than is said reference element on said other side thereof, the distance differential of said bearing surface axes, relative to said centerline, being the same as the distance differential of said reference elements relative thereto, and being equal to said certain distance, whereby a cutting element mounted to act in either said first plane or said second plane of said cutting head body can be disposed in any selected plane, transverse to the longitudinal axis of said rule, by registry of said one or said other registry element of said cutting head body with a selected indicium of said scale, and whereby the distance between said selected plane and a chosen one of either of said bearing surfaces of said strip guide body can be set by bringing said reference element, disposed on the same side of guide body as said chosen bearing surface, into registry with said zero reference point of said rule scale.

2. The system of claim 1 wherein said cutting head body has an upper portion through which said passageway extends, with lateral surfaces equidistantly spaced to opposite sides of an axis perpendicular to the axis of said passageway and having edges at the ends thereof providing said registry elements, said body also having a lower portion on which said first and second mounting means are provided.

3. The system of claim 5 wherein said first cutting component-mounting means comprises a recess formed into an end surface of said lower portion of said body and adapted to receive and engage an insert piece rotatably mounting a cutting wheel on a transverse axis; and wherein said second mounting means comprises a lateral surface on said lower body portion adapted to seat a turret disc having a plurality of cutting wheels mounted about the circumference thereof, said system including an axle member for affixing such a turret disc upon said lateral surface of said lower body portion for rotation about a central axis thereof.

4. The system of claim 1 wherein cutting head has legend means thereon correlating said registry elements to first and second cutting components, for registry with said rule indicia for selective positioning of said head therealong.

* * * * *